United States Patent [19]
Oishi et al.

[11] Patent Number: 4,948,559
[45] Date of Patent: Aug. 14, 1990

[54] ALLOY FOR BUILDING UP VALVE

[75] Inventors: Shinji Oishi; Masahiro Nakagawa; Mototsugu Koyama, all of Toyota; Kanichi Tanaka, Yawata; Syozo Nagai; Kensuke Hidaka, both of Kyoto, all of Japan

[73] Assignees: Toyota Jidosha Kabushiki Kaisha, Toyota; Fukuda Metal Foil & Powder Co., Ltd., Kyoto, both of Japan

[21] Appl. No.: 385,075

[22] Filed: Jul. 26, 1989

[30] Foreign Application Priority Data

Jul. 30, 1988 [JP] Japan .................. 63-191888
Jul. 12, 1989 [JP] Japan .................. 1-179422

[51] Int. Cl.$^5$ .......................................... C22C 30/00
[52] U.S. Cl. ................................................ 420/584
[58] Field of Search .................. 75/251; 420/586.1

[56] References Cited
FOREIGN PATENT DOCUMENTS 59-153872 9/1984 Japan .
61-53413 3/1986 Japan .
62-179891 8/1987 Japan .

Primary Examiner—John F. Niebling
Assistant Examiner—David Schumaker
Attorney, Agent, or Firm—Finnegan, Henderson, Farabow, Garrett & Dunner

[57] ABSTRACT

An alloy for building up a valve according to the present invention comprises: with respect to the total weight of the alloy taken as 100%, 30 to 40% by weight of chromium; 15 to 31% by weight of nickel; 7 to 20% by weight of molybdenum; 0.7 to 2.2% by weight of carbon; 1.5% or less by weight of silicon; and balance of iron and inevitable impurities. The alloy is superior in hardness at high temperatures, PbO resistance and PbO+PbSO$_4$ resistance. In addition, the alloy is suitable for powder buildup welding.

2 Claims, 1 Drawing Sheet

ALLOY FOR BUILDING UP VALVE

BACKGROUND OF THE INVENTION

1. Field of the Invention

This invention relates to an alloy for building up valves of internal combustion engines, especially for building up exhaust valves of automobile engines.

2. Description of the Prior Art

Many conventional valves of internal combustion engines have been used after buildup welding the portions thereof to be abraded with various surface-hardening alloys.

A cobalt-base alloy, consisting mainly of cobalt-chromium and small amounts of tungsten, molybdenum, carbon and so on, is often employed as a buildup alloy for exhaust valves of automobile engines since the cobalt-base alloy is superior in hardness at high temperatures and lead oxide corrosion resistance (hereinafter referred to as PbO resistance). However, the cobalt-base alloy contains a large amount of expensive cobalt, and is a highly expensive material for buildup welding. Therefore a less expensive material which exhibits no less performance than that of the cobalt-base alloy has been required for buildup welding the exhaust valves of the automobile engines.

Japanese Unexamined Patent Publication (KOKAI) No. 153872/1984 discloses an iron-chromium-nickel alloy for engine valves developed for solving the above mentioned problem. The iron-chromium-nickel alloy is employed for forming portions of the engine valve which are required to withstand abrasion by buildup by casting or by building up with a welding rod. To the iron-chromium-nickel alloy is added tungsten and titanium for controlling and refining the growth of the crystal grains of the base metal. To the iron-chromium-nickel there is further added manganese for deoxidizing and desulfurizing. The iron-chromium-nickel alloy furthermore contains aluminum for improving the IbO resistance. However, the inventors of the present invention have investigated and discovered that the iron-chromium-nickel alloy is inferior in its resistance to PbO. Further, instead of the buildup with the welding rod, a method for buildup with alloy powder has been drawing attention because of its operability, buildup efficiency and ease of automation. However, when the iron-chromium-nickel alloy is employed for the method for the buildup with alloy powder, the following drawbacks arise: i.e., a poor powder deposition rate, an uneven bead configuration, pin holes and plow holes in the buildingup layer and oxide intrusions into the buildup layer. The above drawbacks are believed to result from the titanium added for controlling and refining the growth of the crystal grains of the base metal and the aluminium for improving the PbO resistance.

Further, Japanese Unexamined Patent Publication (KOKAI) No. 179891/1987 discloses a nickel-chromium-molybdenum alloy for buildup, although it is not so cheap as the abovementioned iron-chromium-nickel alloy. The nickel-chromium-molybdenum alloy is superior in hardness at high temperatures and the PbO resistance, and the buildup method with alloy powder can be conducted favorably. However, the inventors have investigated and found that the corrosion of the exhaust valves is caused not only by lead oxide but also by lead oxide containing lead sulfate. The inventors have discovered that the nickel-chromium-molybdenum alloy is inferior in corrosion resistance against lead oxide containing lead sulfate (hereinafter referred to as $PbO+PbSO_4$ resistance).

SUMMARY OF THE INVENTION

It is an object of the present invention to develop a buildup welding alloy applicable to the buildup welding and the buildup method with alloy powder, and the build-up welding alloy maintaining required hardness at high temperatures and having excellent PbO resistance and $PbO+PbSO_4$ resistance, thereby satisfying the requirements of valves of internal combustion engines, especially the severe requirements of valves of recent high performance automobile engines.

An alloy for building up a valve according to the present invention comprises: with respect to the total weight of the alloy taken as 100%, 30 to 40% by weight of chromium; 15 to 31% by weight of nickel; 7 to 20% by weight of molybdenum; 0.7 to 2.2% by weight of carbon; 1.5% or less by weight of silicon; and balance of iron and inevitable impurities.

It is a feature of the present invention that the buildup alloy contains 7% or more by weight of molybdenum, more preferably 10% or more by weight of molybdenum in an iron-chromium-nickel alloy. The alloy accordingly becomes superior in hardness at high temperatures, and both in PbO resistance and $PbSO_4$ resistance. Further, the alloy is also suitable for the powder buildup method since the alloy does not contain a large amount of titanium, aluminum and manganese which are undesirable for the components of the powder buildup alloy.

The reasons for restricting the contents of the buildup alloy components of the present invention as above will be hereinafter explained.

(Chromium)

The chromium is solidified in the iron, nickel and molybdenum to form a primary crystal solid solution. The primary crystal solid solution constitutes the substrate of the alloy. A part of the chromium bonds with the carbon as well as the molybdenum to form composite carbide consisting mainly of chromium and molybdenum. In the alloy composition region of the present invention, the composite carbide forms eutectic with the solid solution, and is present in the eutectic. Namely, the chromium coexists with the carbon, and improves the hardness of the alloy. Further, the chromium contributes to improve the PbO resistance and the $PbO+PbSO_4$ resistance. The PbO resistance is improved by the formation of chromic oxide on the surface of the alloy, and the $PbO+PbSO$ resistance is improved by the formation of chromic sulfate and chromic oxide on the surface of the alloy, whereby, the corrosion of the alloy has been prevented from propagating.

The effect of the chromium addition becomes poor when the chromium content is 30% or less by weight. When the chromium content exceeds equal 40% or more by weight, the effect of the chromium addition has not been enhanced. In addition, the ductility of the alloy tends to deteriorate when the chromium content is exceeds 40% or more by weight.

The chromium content is accordingly restricted in the range of 30 to 40% by weight.

(Nickel)

The nickel is solidified in the solid solution of the substrate to improve the tenacity of the alloy and maintain the hardness thereof at high temperatures. The relationship between the nickel content and the vickers hardness is shown in FIG. 1. Further, the nickel coexists with the chromium to improve the PbO resistance. Namely, the chromic oxide film becomes finer and bonds more firmly on the alloy by the nickel.

The relationship between the nickel content and the PbO resistance and the $PbO+PbSO_4$ resistance, namely the relationship between the nickel content and the corrosion loss is shown in FIG. 2. The PbO resistance improvement effect of the nickel addition becomes poor when the nickel content is 15% or less by weight. When the nickel content exceeds 31% or more by weight, the effect of the nickel addition cannot be expected to improve. On the contrary, a high nickel content tends to deteriorate the $PbO+PbSO_4$ resistance. This is because the nickel sulfate of a low melting point is generated on the surface of the alloy, and the corrosion of the alloy is facilitated. Hence, it is undesirable to add a large amount of nickel in the alloy.

The nickel content is accordingly restricted in the range of 15 to 31% by weight.

(Molybdenum)

The molybdenum is solidified in the solid solution of the substrate to improve the tenacity of the alloy as well as the strength of the alloy. Further, the molybdenum bonds with the carbon as well as the chromium and forms the composite carbide of the chromium and molybdenum to improve the hardness of the alloy at high temperatures. Furthermore, the molybdenum contributes greatly to the improvement of the PbO resistance, especially to the improvement of the $PbO+PbSO_4$ resistance. The molybdenum sulfate as well as the chromic oxide and chromic sulfate are formed on the surface of the alloy, whereby the corrosion of the alloy has been prevented from propagating.

The alloy exhibits the most excellent $PbO+PbSO_4$ resistance when the molybdenum content is 10% by weight. When the molybdenum content is less than 10% by weight, the $PbO+PbSO_4$ resistance tends to deteriorate. A limitation of the molybdenum content lies at approximately 7% by weight, though it depends on the nickel content. The $PbO+PbSO_4$ resistance deteriorates when the molybdenum content is 7% or less by weight. It is also undesirable to add the molybdenum by 20% or more by weight, since the alloy becomes too hard and the ductility thereof deteriorates.

The molybdenum content is accordingly restricted in the range of 7 to 20% by weight.

(Carbon)

A part of the carbon is solidified in the solid solution consisting mainly of the iron-nickel as the substrate to increase the strength and hardness of the substrate, but most of the carbon forms the composite carbide consisting mainly of the chromium and molybdenum and forms eutectic composite carbide with the solid solution of the substrate. As a result, the carbon increases the hardness and abrasion resistance of the alloy, and decreases the melting point of the alloy.

The effect of the carbon addition is poor when the carbon content is 0.7% or less by weight. When the carbon content exceeds 2.2% by weight, the composite carbide is formed too much, and hyper-eutectic appears to crystallize the primary crystal of the composite carbide consisting mainly of the chromium and molybdenum. Consequently, it is undesirable to add the carbon by more than 2.2% by weight, since the ductility of the alloy deteriorates.

The carbon content is accordingly restricted in the rang of 0.7 to 2.2% by weight.

(Silicon)

Silicon is usually added as a deoxidizer. In the alloy of the present invention, however, when the silicon is added by 1.5% or more by weight, the tenacity of the alloy deteriorates. This is because an eutectic structures of a low melting point is formed between the solid solution of the substrate, consisting mainly of iron-nickel, and molybdenum silicide.

The silicon content is accordingly restricted to 1.5% or less by weight.

(Inevitable impurities)

The alloy of the present invention can be employed for the powder buildup. In this case, however, there arises concerns on the characteristics of the powder buildup alloy; i.e., the deposition rate during the powder buildup, the bead configuration, the defects in the buildup layer and the like.

The inventors of the present invention have investigated various inevitable impurities contained in the alloy of the present invention, and have discovered that it is preferable to keep the {O} content, resulting from the surface oxidation of the powder and the like, to 0.2% or less by weight. The inventors have also discovered that it is preferable to keep the contents of manganese, aluminium, and titanium, which work as deoxidizers, to 0.1% or less by weight, respectively. When the {O} content is more than 0.2% by weight, and when the contents of the manganese, aluminium and titanium are more than 0.1% by weight, respectively, the bead configuration becomes uneven, and defects may occur in the buildup layer.

Further, the protective film of the chromium oxide, formed on the surface of the alloy and contributing to the PbO resistance, is affected when active metals such as the manganese, aluminium and titanium are contained 0.1% or more by weight in the alloy. In this case, the protective film of the chromium oxide turns into a protective film thereof containing the oxides of manganese, aluminium and titanium. The protective film becomes inferior in the finess and adhesion to the alloy. The PbO resistance of the alloy thus deteriorates since the protective film does not exhibits the sufficient protection effect.

It is accordingly preferable to restrict the contents of the manganese, aluminium and titanium, contained as inevitable impurities in the alloy, to 0.1% or less by weight to obtain the alloy having superior PbO resistance and suitable for the powder buildup.

As described above, the alloy for building up a valve of the present invention is less expensive, and is superior in the hardness at high temperatures, the PbO resistance and the $PbO+PbSO_4$ resistance. Further, the alloy is suitable for the powder buildup. When an exhaust valve is made by the powder buildup employing the alloy of the present invention, the exhaust valve endures the severe operation condition of the high performance automobile engine.

BRIEF DESCRIPTION OF THE DRAWINGS

The above and other objects, features and advantages of this invention will become fully apparent from the following description taken in conjunction with the accompanying drawings, in which.

DESCRIPTION OF THE PREFERRED EMBODIMENTS

Having generally described this invention, a further understanding can be obtained by reference to certain specific preferred embodiments which are provided herein for purposes of illustration only and are not intended to be limiting unless otherwise specified.

Figure 1:
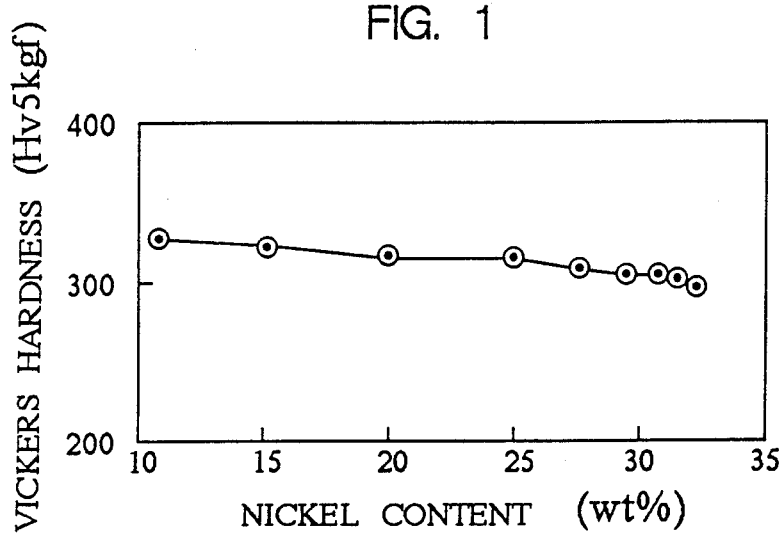
FIG. 1 is a graph showing the relationship between the nickel content and the Vickers hardness at 700° C.
Figure 2:
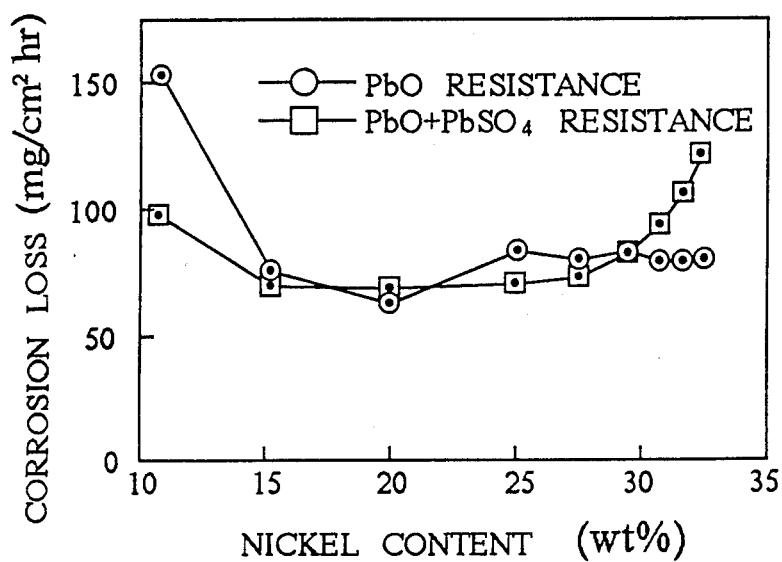
FIG. 2 is a graph showing the relationship between the nickel content and the corrosion losses in PbO resistance test and PbO+PbSO$_4$ resistance test.

PbO+PbSO$_4$ resistance and the powder buildup characteristic were examined to evaluate the alloys of preferred embodiments and comparative examples. The alloys of the preferred embodiments and comparative examples were prepared by mixing and melting the components in the compositions shown in Table 1 and 2 in the ordinary manner. The results of the test concerning the preferred embodiments and comparative examples are shown in Table 1 and Table 2, respectively. The data of the preferred embodiment alloy Nos. 3, 5, 6, 16, and 17, and comparative example alloy Nos. 4 and 5 in the hardness test at high temperature, the PbO resistance test, and the PbO+PbSO$_4$ resistance test, set forth in Tables 1 and 2, are plotted in FIGS. 1 and 2, respectively, to explain the relationship between the nickel content and the hardness at high temperature, and the relationship between the nickel content and the PbO resistance and the PbO+PtSO$_4$ resistance, respectively. The methods for measuring and examining the above characteristics will be described hereinafter.

TABLE 1

| No. of Alloys (Present Invention) | Composition (weight %) | | | | | | | | | | | Hardness at Ordinary temp. Hv | Hardness at High temp. Hv | PbO resistance mg/cm$^2$ per hr | PbO+ PbSO$_4$ resistance mg/cm$^2$ per hr | Pow Bui Cha act ist |
|---|---|---|---|---|---|---|---|---|---|---|---|---|---|---|---|---|
| | Cr | Ni | Mo | C | Si | Fe | Co | W | Mn | Al | Ti | | | | | |
| 1 | 30.1 | 15.3 | 7.2 | 2.0 | 1.5 | balance | — | — | — | — | — | 520 | 341 | 75 | 88 | o |
| 2 | 30.5 | 20.8 | 10.5 | 1.1 | 0.3 | balance | — | — | — | — | — | 410 | 310 | 78 | 81 | o |
| 3 | 35.4 | 20.0 | 10.2 | 1.3 | 0.2 | balance | — | — | — | — | — | 450 | 315 | 62 | 67 | o |
| 4 | 37.8 | 20.5 | 10.3 | 1.2 | 0.3 | balance | — | — | — | — | — | 560 | 330 | 38 | 42 | o |
| 5 | 35.3 | 15.2 | 10.8 | 1.3 | 0.3 | balance | — | — | — | — | — | 520 | 323 | 75 | 70 | o |
| 6 | 35.5 | 25.0 | 11.2 | 1.1 | 0.4 | balance | — | — | — | — | — | 440 | 315 | 83 | 71 | o |
| 7 | 35.0 | 20.3 | 7.0 | 1.5 | 0.4 | balance | — | — | — | — | — | 390 | 305 | 55 | 92 | o |
| 8 | 35.4 | 20.8 | 15.2 | 1.3 | 0.2 | balance | — | — | — | — | — | 530 | 328 | 68 | 66 | o |
| 9 | 33.3 | 24.8 | 20.0 | 0.7 | 0.1 | balance | — | — | — | — | — | 560 | 365 | 70 | 59 | o |
| 10 | 35.8 | 21.0 | 10.5 | 1.5 | 0.1 | balance | — | — | — | — | — | 460 | 318 | 48 | 52 | o |
| 11 | 35.5 | 20.9 | 10.2 | 1.4 | 0.9 | balance | — | — | — | — | — | 470 | 320 | 84 | 49 | o |
| 12 | 35.6 | 20.9 | 10.3 | 0.8 | 0.3 | balance | — | — | — | — | — | 410 | 305 | 65 | 83 | o |
| 13 | 35.3 | 20.4 | 10.9 | 1.6 | 0.2 | balance | — | — | — | — | — | 500 | 312 | 50 | 53 | o |
| 14 | 35.1 | 20.5 | 10.1 | 1.9 | 0.3 | balance | — | — | — | — | — | 550 | 321 | 47 | 39 | o |
| 15 | 32.8 | 17.5 | 15.0 | 1.2 | 1.0 | balance | — | — | 0.07 | 0.08 | 0.03 | 590 | 372 | 83 | 64 | o |
| 16 | 35.1 | 27.5 | 10.3 | 1.2 | 0.4 | balance | — | — | — | — | — | 420 | 310 | 78 | 73 | o |
| 17 | 35.0 | 29.6 | 10.2 | 1.1 | 0.3 | balance | — | — | — | — | — | 420 | 305 | 82 | 81 | o |
| 18 | 35.4 | 30.8 | 10.5 | 1.2 | 0.3 | balance | — | — | — | — | — | 415 | 305 | 81 | 92 | o | o: good
x: bad bead configuration

TABLE 2

| No. of Alloys (Comparative Example) | Composition (weight %) | | | | | | | | | | | Hardness at Ordinary temp. Hv | Hardness at High temp. Hv | PbO resistance mg/cm$^2$ per hr | PbO+ PbSO$_4$ resistance mg/cm$^2$ per hr | Powder Build Characteristic |
|---|---|---|---|---|---|---|---|---|---|---|---|---|---|---|---|---|
| | Cr | Ni | Mo | C | Si | Fe | Co | W | Mn | Al | Ti | | | | | |
| 1 | 28.5 | — | — | 1.1 | 1.3 | — | balance | 4.2 | — | — | — | 430 | 310 | 62 | 127 | o |
| 2 | 27.1 | 20.3 | 10.2 | 1.2 | 0.3 | balance | — | — | — | — | — | 390 | 308 | 135 | 162 | o |
| 3 | 41.2 | 20.5 | 10.8 | 1.4 | 0.2 | balance | — | — | — | — | — | 710 | 351 | 55 | 64 | o |
| 4 | 35.4 | 10.8 | 10.3 | 1.1 | 0.3 | balance | — | — | — | — | — | 760 | 329 | 152 | 97 | o |
| 5 | 35.0 | 32.3 | 10.1 | 1.3 | 0.4 | balance | — | — | — | — | — | 410 | 298 | 81 | 123 | o |
| 6 | 35.8 | 20.3 | 5.2 | 1.2 | 0.3 | balance | — | — | — | — | — | 380 | 289 | 105 | 280 | o |
| 7 | 35.4 | 20.8 | 24.6 | 1.4 | 0.3 | balance | — | — | — | — | — | 680 | 325 | 123 | 118 | o |
| 8 | 35.5 | 20.1 | 10.9 | 1.1 | 2.0 | balance | — | — | — | — | — | 460 | 305 | 204 | 89 | o |
| 9 | 35.3 | 20.1 | 11.0 | 1.1 | 2.4 | balance | — | — | — | — | — | 470 | 308 | 420 | 103 | o |
| 10 | 32.6 | 20.5 | 10.5 | 0.5 | 0.2 | balance | — | — | — | — | — | 360 | 268 | 68 | 78 | o |
| 11 | 37.5 | 20.3 | 10.4 | 2.5 | 0.3 | balance | — | — | — | — | — | 680 | 341 | 51 | 136 | o |
| 12 | 31.1 | 21.5 | 3.0 | 1.3 | 0.4 | balance | — | 3.1 | — | — | — | 410 | 302 | 92 | 235 | o |
| 13 | 27.4 | 15.0 | 2.2 | 1.1 | 0.6 | balance | — | 6.3 | 0.35 | 3.8 | 0.012 | 475 | 325 | 609 | 133 | x |
| 14 | 30.5 | balance | 9.1 | 2.2 | 0.7 | 1.5 | — | — | — | — | — | 425 | 280 | 61 | 284 | o |
| 15 | 35.3 | 31.6 | 10.3 | 1.3 | 0.4 | balance | — | — | — | — | — | 410 | 302 | 80 | 106 | o | o: good
x: bad bead configuration

The hardness at an ordinary temperature, the hardness at a high temperature, the PbO resistance, the (1) Hardness test at an ordinary temperature The alloys of the preferred embodiments and comparative examples were melted in an electric furnace in argon gas atmosphere, and molded in a mold made of graphite. The mold had a cavity having an inside diameter of 15 mm and a chiller at the bottom thereof. The molded bodies were cut into 15 mm$\phi \times$ 10 mm to obtain test pieces.

The hardness was measured at a chilled potion of the test piece, namely the portion contacted with the chiller, by using a Vickers hardness tester (load: 20 kgf).

(2) Hardness test at a high temperature

The same test pieces obtained for the above hardness test at the ordinary temperature were employed to measure Vickers hardness at 700° C. using a Vickers hardness tester for a high temperature application (load: 5 kgf).

(3) PbO resistance test

The alloys of the preferred embodiments and comparative examples were melted in an electric furnace in argon gas atmosphere, and molded in a glass tube by suction. The glass tube had an inside diameter of 5 mm$\phi$. The molded bodies were cut into 5 mm$\phi \times$ 20 mm to obtain test pieces. The test pieces were immersed into 30 g of PbO heated at 920° C. for an hour to measure the corrosion loss.

(4) PbO+PbSO$_4$ resistance test

The same test pieces obtained for the above PbO resistance test were also employed in this test. The test pieces were immersed into a mixture of PbO and PbSO$_4$ heated at 900° C. for one hour to measure corrosion loss. The mixture weighed 30 g, and consisted of 60% by weight of PbO and 40% by weight of PbSO$_4$.

(5) Powder buildup test

The alloys of the preferred embodiments and comparative examples were powdered by an ordinary gas atomizing. The powders of 80 to 350 meshes were built up on an base metal of austenite heat resistance steel "SUH35" (Japanese Industrial Standards) by using a plasma powder buildup apparatus in the conditions shown in Table 3. The base metal size was 50 mm in width $\times$ 100 mm in length $\times$ 10 mm in thickness. The wettability and the bead configuration were measured to evaluate the powder building up character.

TABLE 3

| | |
|---|---|
| Shielding gas discharge | 30 l/min |
| Plasma gas discharge | 4 l/min |
| Welding current | 130 A |
| Welding speed | 65 mm/min |
| Powder supply | 30 g/min |

(6) Durability test using an actual engine and its results

Sample No. 3 of the preferred embodiments and sample No. 1 of the comparative examples were powdered by the ordinary gas atomizing. The powders of 80 to 350 meshes were built up on a valve preform of the austenite heat resistance steel "SUH35" in a condition shown in Table 4. The valve preform had a valve head having a diameter of 43 mm$\phi$. After the buildup, the valve preforms built-up with the alloys of sample No. 3 of the preferred embodiments and sample No. 1 of the comparative examples were finished to a predetermined shape of predetermined diameters. The valves were thus molded. The {O} content was 750 ppm in the alloy powders of sample No. 3 of the preferred embodiments.

TABLE 4

| | |
|---|---|
| Shielding gas discharge | 40 l/min |
| Plasma gas discharge | 4 l/min |
| Welding current | 120 A |
| Welding speed | 300 mm/min |
| Powder supply | 10 g/min |

A 2.5 liter in-line 6-cylindered gasoline engine was prepared, and the valves built-up with the alloys of sample No. 3 of the preferred embodiments and Sample No. 1 of the comparative examples were mounted on the first to third cylinders of the engine and the fourth to sixth cylinders thereof, respectively. Then, a durability test using the actual engine was conducted in the conditions shown in Table 5.

TABLE 5

| | |
|---|---|
| Engine speed | 4200 rpm |
| Engine load | Full |
| Cooling water temp. | 90° C. |
| Lubricating oil temp. | 120° C. |
| Fuel | Leaded gasoline |
| Duration | 300 hours |

The corrosion losses of the faces of the valves built-up with sample No. 3 of the preferred embodiments and sample No. 1 of the comparative examples were 8 to 12 $\mu$m and 10 to 21 $\mu$m, respectively. The depths of the corrosion in the faces of the valves were 2.5 $\mu$m and 23 $\mu$m, respectively.

(Evaluation)

As shown in Table 1, the alloys of the preferred embodiments were superior in hardness at the high temperature. Namely, the Vickers hardness at the ordinary temperature was from Hv 390 to Hv 590, and the Vickers hardness at 700° C. was Hv 300 or more for all of the alloys of the preferred embodiments.

Further, the alloys of the preferred embodiments were superior in the corrosion resistance. Namely, the corrosion losses when immersed into the PbO heated at 920° C. and the corrosion losses when immersed into the mixture of 60% by weight of PbO and 40% by weight of PbSO$_4$ heated at 900° C. were 100 mg/cm$^2$ per hour or less for both cases.

Furthermore, there arose no problems on the buildup operability when the powdered alloys of the preferred embodiments were built-up on the valve preforms. The deposition rates were 90% or more, and there were no defects in the buildup layers.

Moreover, the engine valves built-up with the powdered alloys of the preferred embodiments were superior in the abrasion resistance, the PbO resistance and the PbSO$_4$ resistance, and had performance sufficiently satisfying the severe operation conditions of the high performance automobile engine.

On the other hand, as shown in Table 2, when either one of the component elements did not fall in the limiting ranges of the present invention, at least one of the abovementioned characteristics; i.e., the hardness at the high temperature, the abrasion resistance, the PbO resistance and the PbO+PbSO$_4$ resistance deteriorated. As can be seen from the results of the durability test using the actual engine, the valve built-up with Sample No. 1 alloy of the comparative examples was inferior in the abrasion resistance and the corrosion resistance. Sample No. 3 alloy of the comparative examples, in which only the chromium content did not fall in the limiting ranges of the present invention (namely the chromium content was 41.2%) exhibited the characteristics no less than the preferred embodiments did, however, Sample No. 3 alloy was undesirable from the viewpoint of practicality. This is because the hardness at the high temperature, the corrosion resistance (the PbO resistance and the $PbO+PbSO_4$ resistance) and so on were not improved greatly even when more than 40% of chromium was added in the alloy. The upper limit of the chromium content was thus set to 40% by weight in the present invention.

What is claimed is:

1. An alloy for building up a valve comprising; with respect to the total weight of said alloy taken as 100%, 30 to 40% by weight of chromium; 15 to 31% by weight of nickel; 7 to 20% by weight of molybdenum; 0.7 to 2.2% by weight of carbon; 1.5% or less by weight of silicon; and balance of iron and inevitable impurities, wherein the contents of manganese, aluminum and titanium contained in said inevitable impurities are 0.1% or less by weight, respectively.

2. An alloy for building up a valve comprising; with respect to the total weight of said alloy taken as 100%, 30 to 40% by weight of chromium; 15 to 31% by weight of nickel; 7 to 20% by weight of molybdenum; 0.7 to 2.2% by weight of carbon; 1.5% or less by weight of silicon; and balance of iron and inevitable impurities, wherein said alloy is free from manganese, aluminum and titanium.

* * * * *